June 8, 1948.  W. B. ANDERSON ET AL  2,442,746
FLOW CONTROL APPARATUS
Filed April 13, 1944

WITNESSES:
William F. Swezey
JM Fowler

INVENTORS
William B. Anderson and
Harold D. Shaw
BY Roy N. Erwall
ATTORNEY

UNITED STATES PATENT OFFICE 2,442,746

FLOW CONTROL APPARATUS

William B. Anderson, Detroit, Mich., and Harold D. Shaw, Longmeadow, Mass., assignors to Westinghouse Electric Corporation, East Pittsburgh, Pa., a corporation of Pennsylvania Application April 13, 1944, Serial No. 530,792

4 Claims. (Cl. 251—5)

This invention relates to flow control devices of the type in which the flow of a fluid medium may be variably controlled or entirely shut off at the will of the operator.

An object of the invention is to provide a flow control device capable of infinite adjustment between fully open and fully closed position by the slight turning of an adjustable member.

A further object is to provide variable flow control by the variation in compression on a resilient apertured body.

Still another object is to provide a resilient flow control device so constructed and arranged as to produce a minimum amount of wear on its operating parts.

A more specific object is to provide a cheap, practical and readily assembled resilient flow control device.

These and other objects are effected by the invention as will be apparent from the following description and claims taken in connection with the accompanying drawings, forming a part of this application, in which:

Figure 1:
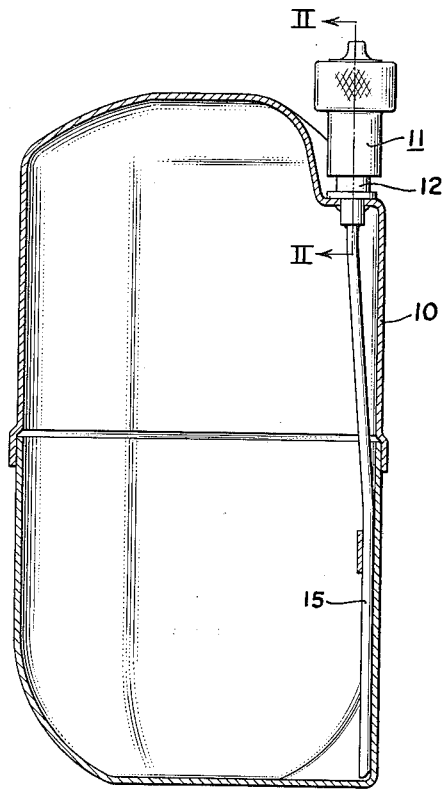
Fig. 1 is an elevation showing the improved flow control device applied to a pressure vessel, the latter being shown in section.

In the drawings, 10 represents a pressure vessel whose construction and materials are determined by the nature of the medium confined therein and from which the flow of the medium is controlled by our improved flow control device 11. The vessel as shown is illustrative only and merely indicates a source of fluid under pressure. A nipple 12 is brazed or otherwise secured to the vessel 10. The outer end of the nipple is screw threaded, as shown at 13, and the inner end of the control device is threaded, as at 14, for adjustable engagement with the threads 13. Should the vessel 10 be intended to dispense a liquid under pressure, a tube 15 extending to the bottom of the vessel 10 may be brazed or otherwise secured to the nipple and in fluidtight engagement therewith. The tube 15 is necessary only if it is desired to dispense a liquid with the container in a substantially vertical position. Otherwise a liquid may be dispensed by properly tilting the vessel.

The flow control device proper comprises a body member 16 having a recess 17 at its inner end in which the threads 14 are provided. The outer end is bored through or otherwise apertured, as indicated at 18. Preferably the outer end of bore 18 is swaged or otherwise formed to provide a reduced orifice 19. The provision of the reduced orifice is determined by the nature of the medium whose flow is to be controlled. In the particular application of the device herein described, that is, in the control of an insecticidal aerosol using dichlorodifluoromethane as the propelling medium, it has been found that an orifice diameter between 0.025 and 0.030 inch gives the best results when the channel 22 in resilient plug 21, described below, is 0.048 inch. The body member 16 may be provided with an enlarged portion 20 to serve as a finger grip.

The flow-controlling member proper comprises a resilient plug 21 provided with a longitudinal channel 22. The plug fits tightly against the walls of the recess 17, and if made of natural rubber, synthetic rubber or equivalent materials, may be vulcanized to these walls or otherwise cured after being inserted, or it may be molded and cured before it is inserted into the body 16. Obviously the nature of this material will be determined by the composition of the fluid medium passing through the channel, the main requirement being that it has a resiliency and recovery after distortion approaching that of natural rubber. Preferably a portion of the resilient member engages some of the threads 14 to provide additional gripping and sealing surface between the resilient member and the body member 16.

Figure 2:
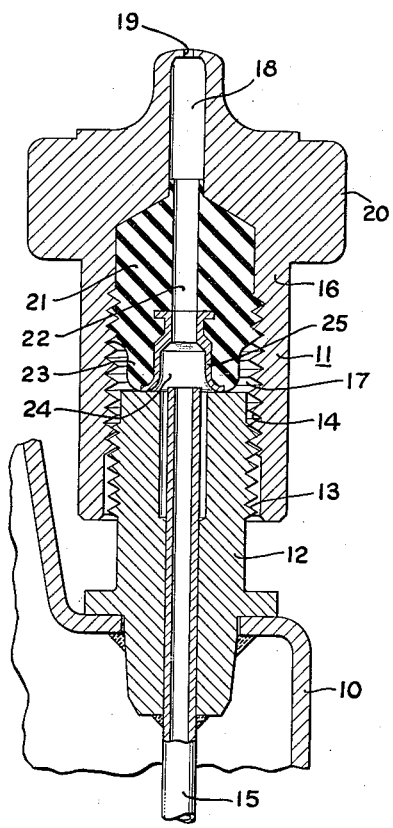
Fig. 2 is a section on the line II—II of Fig. 1, on an enlarged scale, and showing the flow control device in fully open position.

The lower or inner end of the resilient member is provided with a reduced rounded end or shoulder 23 having a somewhat enlarged recess 24 into which is molded a hollow ferrule 25, preferably made of metal or other rigid material. This ferrule, together with the rounded shoulder 23, provides a minimum effective contact surface with the top of nipple 12 when the control device is moved to closed position (Fig. 3), thus to a large extent eliminating the abrasive effect of the torsional twist which would be the case if this surface were otherwise flat. At the same time, this shoulder 23 maintains continuous sealing engagement with the upper end of the nipple 12 even when the passage 22 is in full open position (Fig. 2) so that leakage of fluid under pressure past the threads 13, 14 is prevented at all times. The recess 24 is provided to take care of any portion of tube 15 which may project beyond the end of the nipple.

The operation of the device is apparent from the foregoing description and the drawings.

Figure 3:
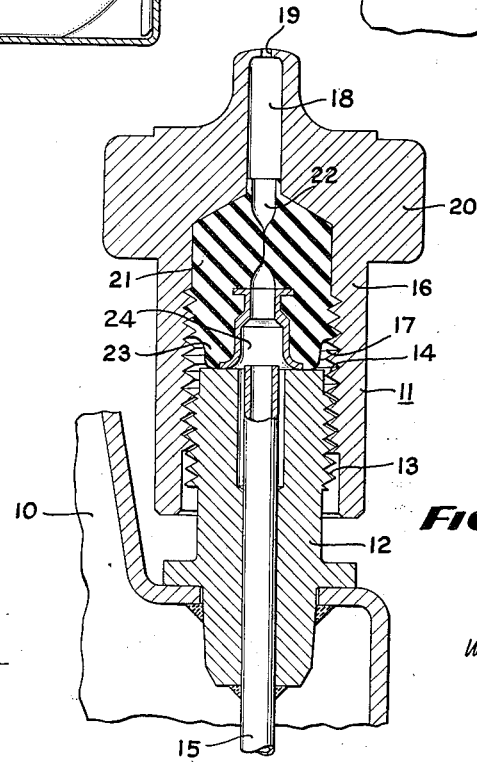
Fig. 3 is a view similar to Fig. 2 but showing the flow control device in fully closed position.

Fig. 3 shows a somewhat schematic view of the device in the closed position, with the body member screwed down on the nipple until the resilient member 21 has been compressed and distorted to cut off the flow through channel 22. From this position, the resilient member may be released to control the enlargement of the channel 22 to any desired degree up to the full-open position of Fig. 2 and thereby to control the rate of flow of the fluid medium.

The foregoing device provides a simple, economical and practical device for controlling the flow of fluids under pressure. It has been used with particular effectiveness to control the flow of liquid dichlorodifluoromethane admixed with lethal agents to form an insecticidal aerosol. In such use, it has been found unnecessary to open the channel 22 to its full extent to obtain the desired aerosol.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. Variable flow control means comprising a rotatable body member, and a deformable resilient member in and rotatable with the body member, said deformable member having a channel therethrough for the passage of fluid and being adapted when deformed by engagement with a fixed member to regulate the flow of fluid through said channel between fully opened and fully closed positions.

2. Variable flow control means comprising a rotatable body member, and a deformable resilient member in and rotatable with the body member, said deformable member having a channel therethrough for the passage of fluid and being adapted when deformed by engagement with a fixed member to regulate the flow of fluid through said channel between fully opened and fully closed positions, said deformable member having a reduced shoulder portion at its inner end for engaging said fixed member to deform the deformable member as the body member is rotated toward the closing position.

3. Variable flow control means comprising a rotatable body member, and a deformable resilient member in and rotatable with the body member, said deformable member having a channel therethrough for the passage of fluid and being adapted when deformed by engagement with a fixed member to regulate the flow of fluid through said channel between fully opened and fully closed positions, said deformable member having a reduced shoulder portion at its inner end for engaging said fixed member to deform the deformable member as the body member is rotated toward the closing position, said shoulder portion being so constructed and arranged as to continuously maintain sealing engagement with said fixed member during all positions of said deformable member from fully open to fully closed.

4. Variable flow control means comprising a rotatable body member, a deformable resilient member in and rotatable with the body member, said resilient member having a channel therethrough for the passage of fluid and being adapted when deformed by engagement with a fixed member to regulate the flow of fluid through said channel between fully opened and fully closed positions, said deformable member having a reduced shoulder portion at its inner end for engaging said fixed member to deform the deformable member as the body member is rotated toward the closing position, and a relatively rigid hollow ferrule attached to said reduced shoulder portion.

WILLIAM B. ANDERSON.
HAROLD D. SHAW.

REFERENCES CITED

The following references are of record in the file of this patent:

UNITED STATES PATENTS

| Number | Name | Date |
|---|---|---|
| 34,419 | Fuller | Feb. 18, 1862 |
| 640,878 | Curley | Jan. 9, 1900 |
| 1,657,663 | Devereux | Jan. 31, 1928 |
| 2,146,917 | Rosenberger | Feb. 14, 1939 |
| 2,261,531 | Thomas | Nov. 4, 1941 |

FOREIGN PATENTS

| Number | Country | Date |
|---|---|---|
| 355,675 | Germany | 1922 |